(12) United States Patent
Colless et al.

(10) Patent No.: US 8,234,812 B1
(45) Date of Patent: Aug. 7, 2012

(54) FODDER-GROWING ENCLOSURE (76) Inventors: Terry Colless, Toowoomba South (AU);
Flavio Raccanello, Toowoomba South (AU)

( * ) Notice: Subject to any disclaimer, the term of this patent is extended or adjusted under 35 U.S.C. 154(b) by 0 days.

(21) Appl. No.: 13/046,690

(22) Filed: Mar. 11, 2011

Related U.S. Application Data (63) Continuation-in-part of application No. 12/282,953, filed on Dec. 3, 2008, now abandoned.

(51) Int. Cl.
*A01G 31/00* (2006.01)
(52) U.S. Cl. .......................................... 47/61
(58) Field of Classification Search .................. 47/61
See application file for complete search history.

(56) References Cited

U.S. PATENT DOCUMENTS

| | | | |
|---|---|---|---|
| 2,928,211 A * | 3/1960 | Martin | 47/60 |
| 3,432,965 A | 3/1969 | Smith et al. | |
| 3,458,951 A | 8/1969 | Martin | |
| 3,991,514 A * | 11/1976 | Finck | 47/61 |
| 4,292,762 A | 10/1981 | Fogg et al. | |
| 4,914,858 A | 4/1990 | Nijssen et al. | |
| 5,101,593 A | 4/1992 | Bhatt | |
| 5,493,808 A | 2/1996 | Munday | |
| 5,946,853 A | 9/1999 | Jacobs et al. | |
| 6,055,771 A | 5/2000 | Warnacut | |
| 6,578,319 B1 | 6/2003 | Cole et al. | |
| 2009/0235583 A1 | 9/2009 | Colless et al. | |

FOREIGN PATENT DOCUMENTS

| | | |
|---|---|---|
| BE | 902017 | 7/1985 |
| JP | 11-000054 | 1/1999 |
| WO | 9526623 | 10/1995 |

* cited by examiner

*Primary Examiner* — Frank T Palo
(74) *Attorney, Agent, or Firm* — QuickPatents, Inc.; Kevin Prince (57) ABSTRACT

A transportable fodder production unit is disclosed that includes an insulated container having a front end and a rear end, a plurality of trays each having drain apertures through a bottom side thereof, a racking system for supporting each of the trays with a plurality of shelves extending from the front end of the container to the rear end of the container, an irrigation system attachable to a water source and having a water tank in fluid communication with a plurality of spray heads through a pump and a plurality of pipes, a lighting system that maintains a predetermined illumination within the container, a thermal control system that maintains the temperature inside the container within a predetermined temperature range, and a central control system for activating the other systems and maintaining electrical load balancing on a power source.

15 Claims, 9 Drawing Sheets

FIG. 10

FODDER-GROWING ENCLOSURE

CROSS-REFERENCE TO RELATED APPLICATIONS

This application is a continuation-in-part of U.S. patent application Ser. No. 12/282,953, filed on Dec. 3, 2008, and incorporated herein by reference.

STATEMENT REGARDING FEDERALLY SPONSORED RESEARCH AND DEVELOPMENT

Not Applicable.

FIELD OF THE INVENTION

The present invention relates to the production of fodder. In particular, the present invention relates to a fodder production unit.

DISCUSSION OF RELATED ART

There have been many systems proposed for the intensive production of fodder in order to provide feed for livestock. Systems have been proposed that range from simple trays in which seeds are grown, through hydroponic systems to various automated systems. The main difficulty with all of these systems for producing fodder is achieving sufficient fodder production in an economical manner.

Systems involving the production of fodder in trays is a batch-wise process that results in the harvesting of large quantities of fodder which needs to be stored for later use. The next batch of feed only becomes available once the next crop of fodder has been grown ready for harvest.

These batch-wise systems may be staggered in planting and result in a more evenly distributed production of fodder. However these systems require considerable manipulation of the trays at planting, throughout the growth of the fodder and upon harvesting. The manipulation of trays of fodder is often difficult because of the weight of the trays as the fodder grows and is often generally inconvenient, labor intensive and results in an uneven growth of fodder.

Automated units have been constructed in which trays are mechanically moved along a conveyor system whereby trays sown with seeds are picked up and trays of fodder are then harvested from the other end of the production unit. The capital outlay required for such a system is often prohibitive and as a result automated systems have not generally found acceptance in the production of fodder for livestock.

A number of hydroponic systems have also been used to produce fodder. These systems require the controlled supply of nutrients to the germinating seeds and growing sprouts and are generally used in a batch-wish cropping system. The cost of the hydroponic system and the controlled provision of nutrients is generally either uneconomic or labor intensive.

U.S. Pat. No. 3,991,514 to Finck on Nov. 16, 1976, teaches a continuous fodder production operation having various irrigation and temperature control systems, whereby seeded trays can be loaded onto the rear of a shelving system and trays with mats of grown fodder can be removed from the front of the shelves by the operator. However, in such a system it is difficult to advance the trays of fodder once a shelf has become even partially loaded with fodder trays, and particularly for any crops having a relatively large number of growing intervals resulting in a relatively large number of trays that must be advanced each interval on each shelf. Further, such a device requires significant power capacity as many of the electrical systems are operated by dedicated timer circuits, or are typically left on, and as such multiple such systems can be drawing power simultaneously. U.S. Pat. No. 2,928,211 to Martin on Mar. 15, 1960, teaches a similar hydroponic device with many of the same drawbacks.

The systems described above all have inherent problems or constraints that make the production of fodder for use as a feed for livestock uneconomic or impractical.

We have now found a fodder production unit that enables the intensive production of fodder and that overcomes or alleviates at least one of the above disadvantages. Other objects and advantages of the invention will become apparent from the following description.

SUMMARY OF THE INVENTION

The present invention is a transportable fodder production unit for connecting with a water source and a power source. The fodder production unit includes an insulated container having a front end and a rear end. Selectively openable and lockable doors are preferably included on each end.

A plurality of trays are included, each having a plurality of drain apertures through a bottom side thereof towards the rear wall of the tray, such that when supported slightly tilted to the rear, water in the trays runs towards the rear wall of the tray and the drain apertures proximate thereto. Each tray may further include a pair of side walls. A front edge of the tray may include a lip which facilitates the ready removal of mats of grown fodder. The trays may each include at least one intermediate spaced wall for providing the production of segmented mats of the grown fodder.

A racking system is included for supporting each of the trays within the container. The racking system includes a plurality of shelves extending from the front end of the container to the rear end of the container. Each shelf is of sufficient width to receive at least one of the trays and of sufficient depth to receive a predetermined number of rows of the trays to cycle through the container in a growing period. The shelves each include a plurality of rails adapted to support each of the trays and to facilitate the sliding of the trays from the front end of the container to the rear end of the container.

An irrigation system is included, preferably substantially contained within the container. The irrigation system includes a water tank in fluid communication with a plurality of spray heads through a pump and a plurality of pipes. The water tank further includes a fill valve connected with the water source and is adapted to refill the water tank when a water level within the water tank drops below a predetermined volume of water. With the water tank inside the container, the temperature of the water in the water tank may become equalized with the internal temperature of the container.

Preferably the water tank further includes a step on a top surface thereof. The step and water tank are adapted to support the weight of a person thereon, such as with strengthening ribs. The water tank is positioned proximate the front end of the container on a floor surface thereof, whereby any heat retained in the water inside the water tank heats the front end of the container to promote germination of the fodder seeds. The water tank may further include a water heater for heating the water in the water tank to a predetermined temperature.

A lighting system is connected with the power source and maintains a predetermined illumination within the container. Such a lighting system includes, at a minimum, a plurality of bulbs for illuminating each tray from the rear end of the container towards the front end of the container, stopping at a point before the growing process wherein the seeds have not yet sprouted.

A thermal control system is connected with the power source and maintains the temperature inside the container within a predetermined temperature range. The thermal control system may further include a humidity control system for maintaining the humidity within the container within a predetermined humidity range. Such a thermal control system may include a reverse cycle air condition preset to maintain the temperature in the container within the range of from 18 to 23 degrees Celsius, and within the range of between 40 and 80 percent humidity.

A central control system may be further included, and electrically connected with the pump of the irrigation system, the lighting system, the thermal control system, and the water heater. As such, the control system may be programmed to activate the pump to spray the trays on a preset schedule, to activate the lighting system on a present schedule, to activate the thermal control system as necessary based on the temperature and humidity within the container, and for controlling the water temperature based on a preset schedule. The central control system regulates the electrical current draw from the fodder production unit by ensuring the pump, lighting system, thermal control system, and water heater are never activated simultaneously.

In use, the trays are filled with seeds and loaded into the rear end of the container. The trays are urged forward by an operator as the fodder progresses through the growing period. The trays are removed at the front end of the container with mats of grown fodder. Throughout the growing process, the pump periodically pumps water from the water tank through the pipes to the plurality of spray heads for spraying each tray with a predetermined volume of water, typically as measured by activating the pump for a predetermined period of time.

The present invention enables the intensive production of fodder and that overcomes or alleviates the disadvantages of the prior art. Other features and advantages of the present invention will become apparent from the following more detailed description, taken in conjunction with the accompanying drawings, which illustrate, by way of example, the principles of the invention.

DESCRIPTION OF THE DRAWINGS

In order that the various aspects of the invention may be more fully understood and put into practical effect, a number of preferred embodiments will be described with reference to the accompanying drawings, in which.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

In accordance with a first aspect of the present invention there is provided a transportable fodder production unit 10 comprising an insulated container 20 wherein said insulated container contains a racking system 50, an irrigation system 90, a lighting system 150 and a thermal control system 160. The racking system 50 has a plurality of shelves 60 extending from the rear end 28 of the container 20 to the front end 22 of the container 20, said shelves 60 being of sufficient width to receive at least one fodder growing tray 30 and of sufficient depth to receive a predetermined number of rows of trays 30 to cycle through the container in a growing period. As such, seeded trays 30 can be loaded onto the rear of the shelves 60 and trays 30 with mats 13 of grown fodder can be removed from the front of the shelves 60, said trays 30 being urged forward by an operator as the fodder progresses through the growing period. The irrigation system 90 comprises a plurality of spray heads 110 positioned in the racking system 60 for periodically spraying each tray 30 with a predetermined volume of water, the lighting system 150 maintaining a predetermined illumination and the thermal control system 160 maintaining the temperature within a predetermined temperature range.

By controlling the growing conditions we have found that the growing cycle for fodder may be controlled so that it can be effectively implemented on a contained racking system 50 whereby trays 30 of growing fodder may simply be urged forward across the racking system 50. As such, seeds sown on a tray inserted at the rear end 28 of the racking system 50 can be urged forward by the insertion of a subsequent tray 30, whereby a tray 30 of fodder ready to harvest is advanced to the front of the racking system 50. It is the control of the growing conditions that enables the simple use of trays 30 being urged across the racking system 50 by the insertion of the subsequent tray 30 in a manner which allows for the economic production of fodder. The fodder growing unit 10 of the present invention may be used to sprout a variety of grains and seeds for livestock and human consumption including barley, alfalfa, sunflowers, mung beans, wheatgrass, fenugreek, onion, snow peas, and the like.

In use, a first row of trays 30 are seeded within the selected seeds and positioned at the rear end 28 on the shelves 60. The container 20 is closed and reopened in the next interval when a further row of trays 30 are seeded and positioned at the rear end 28 on the shelves. Positioning of the second row of trays 30 at the rear end 28 on the shelves 60 advances the first row of trays 30 forward. The process is repeated until the first row of trays 30 is advanced to the front end 22 of the container 20 on the shelves 60, whereupon the first row of trays 30 may be removed with a mat 13 of fodder for consumption. Upon the continued operation of the fodder growing unit 10, the row of trays 30 at the front end 22 of the container 20 may be removed and the mass of fodder extracted for consumption prior to the next row of newly seeded trays 30 being introduced to the rear end 28 of the container 20.

In a preferred embodiment of the present invention, a tray 30 is provided which facilitates the sewing and harvesting of the sprouted fodder. In a preferred form the growing tray has walls 36,38 on either side and at the rear of the tray. A front 32 of the tray 30 has a lip 33 or bund which facilitates the retention of seeds 12 and moisture but allows the ready removal of the grown mats 13 of sprouts or fodder. In another preferred form of the present invention the trays 30 are provided with intermediate spaced walls 39 extending from the front 32 to the rear wall 38 of the tray 30 thereby providing for biscuits or mats 13 of grown fodder to be able to be readily removed in a desired size rather than a mats 13 that is the size of the entire tray 30.

The insulated container 20 for use in the present invention may be of any convenient configuration. We have found that the insulated container 20 that is preferably sized for transportation on a tilt truck or the like.

The racking system 50 has a plurality of shelves 60 that extend from the rear end 28 of the container 20 to the front end 22 of the container 20, where such shelves 60 are of a depth suitable to receive a predetermined number of rows of trays 30. The number of rows of trays 30 will be dependent upon the seeds being sprouted as well as the growing conditions. Typically the shelves 60 will be sufficiently deep so as to receive six trays 30 such as would be generally required to sprout barley for livestock feed. The shelves may be of sufficient width to receive a desired number of trays 30.

The dimension of the shelves 60 and the size of the trays 30 is preferably configured so that the trays 30 are able to be readily manageable by one person with fully sprouted seeds for harvesting.

The irrigation system 90 pumps water through a series of pipes 130 and sprinklers or spray heads 110 so that the trays 30 of sprouts are irrigated. It is desirable that the temperature of the water that is sprayed onto the trays 30 of sprout is at a temperature that is similar to the temperature of the inside of the insulated container 20. We have found that the water temperature has a significant impact on the growth of the sprouts and this is believed to because of thermal transfer of latent heat in the water. For example, where water is used that is significantly above the temperature inside the insulated container 20, the temperature of the container 20 may be caused to rise significantly, which imposes a greater load on a thermal control system 160 to cool the temperature inside the container 20. The use of water that is significantly below the temperature of the insulated container 20 can adversely affect the growing vigor of the sprouts. The irrigation system 90 preferably includes a pump 120 that pumps water through a system of spray heads 110 positioned in the racking system 50 for periodically spraying each tray 30 with a predetermined volume of water. A central controller or control system 190 may be used to ensure that a predetermined volume of water is provided to each tray 30 at preset intervals as required for the type of seed 12 in the trays 30.

The insulated container 20 also contains a lighting system 150 that provides sufficient light for photosynthesis in order to enable optimal growth of the sprouts. We have found that by positioning two or three fluorescent lights at the front end 28 of the insulated container 20, the growth of the sprouts may be promoted and the grown sprouts being provided with a desirable green color. By providing more or less light, the color of the sprouts may be controlled. The provision of more light generally results in greener sprouts.

The thermal control system 160, preferably in the form of a reverse cycle air conditioner, desirably maintains the temperature in the insulated container in the range of from 18 to 23 degrees. We have found that at this temperature range optimal growth of the sprouts is obtained. We have also found that the thermal control system 160 should promote the movement of air throughout the insulated container 20 and preferably be adjusted for a high fan speed. A thermostat (not shown) is included in the thermal control system 160.

Of course, the growing conditions will vary for different types of seed 12. For growing barley, for example, the optimal conditions have been found to be a temperature of about 23 degrees Celsius at a humidity of between 40 and 80 percent. Accordingly, in hotter environments it is generally considered desirable to place the insulated container 20 in a shaded location so as to cut down the running costs involved in maintaining the desired temperature.

Within the trays 30, the roots of the sprouts should also be kept moist, but not wet. For this reason, the trays can also be provided with an apertured bottom side 31 to enable excess water to drain from the trays 30. The insulated container may include a drainage system (not shown) so that water draining from the trays 30 can be collected and recycled, if desired, for use in either irrigation of the sprouts or stored for cleaning of the trays 30 with a suitable sanitizing agent.

Figure 10:
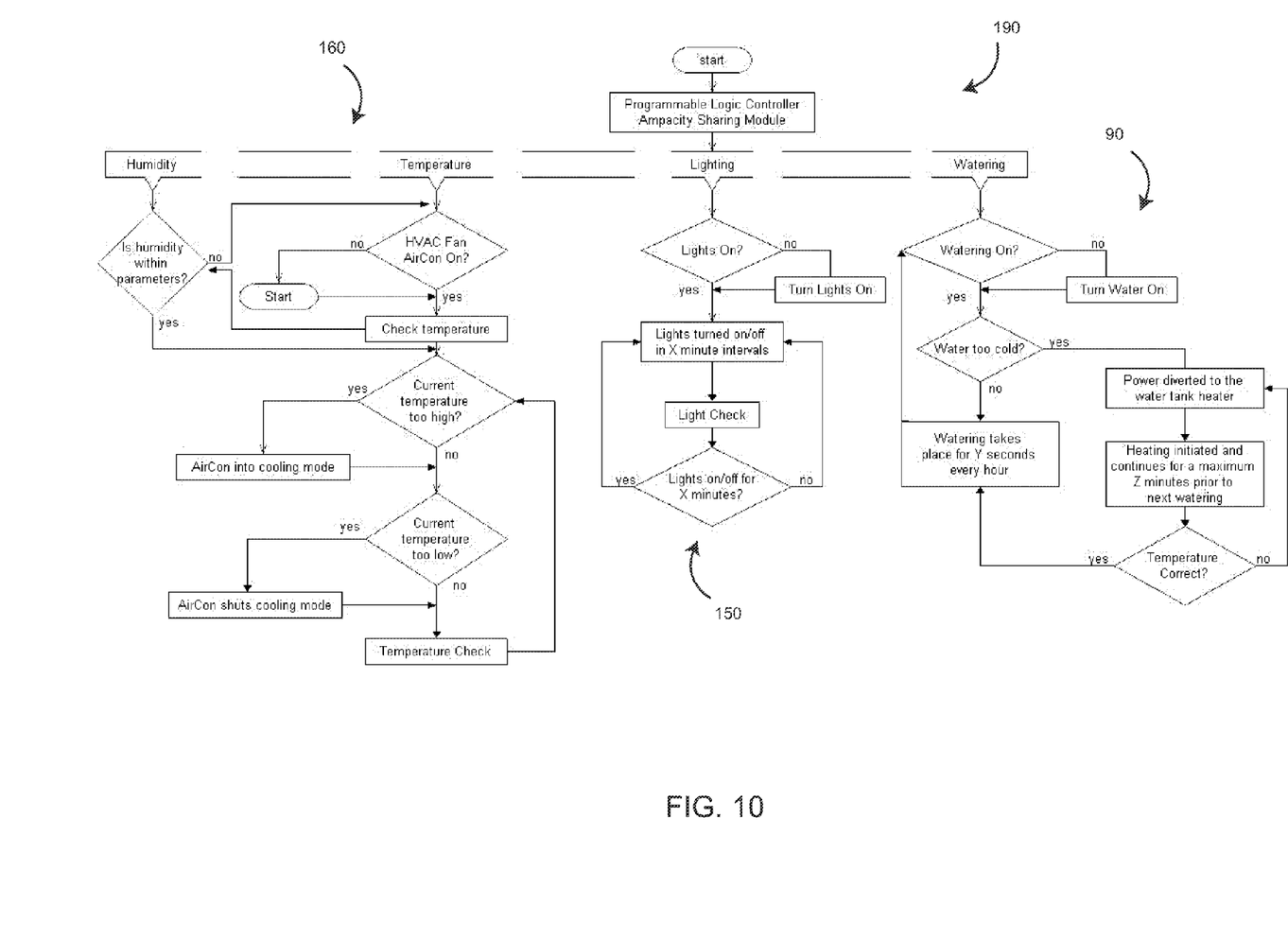
FIG. 10 is a general flow chart of the operation of a central control system of the invention.

We have found that with barley, it is desirable to avoid temperatures above 24 degrees Celsius as at those temperatures the growth of mold may be promoted. As default settings, we have found that it is desirable to keep a fan of the thermal control system on, to keep the illumination system active for twenty minutes and then off for twenty minutes and then repeat, and to keep the irrigation system 90 active for 24 seconds every hour (FIG. 10). The control system 190 may be programmed to cause these settings by default, unless overridden by the operator, for example.

In use, the trays 30 are seeded with a desired amount of seed after they have been cleaned. For best results, it is desirable to maintain a sterile growing environment and use trays 30 that have been cleaned with a suitable sterilizing agent, such as chlorine. If mold is detected within the insulated container 20, the sprouts may be irrigated with chlorinated water in order to bring the system back to a clean and sterile state. Desirably, the use of chlorinated water is avoided over extended periods. We have found that the use of chlorinated water at relatively high concentrations may result in the tips of the sprouts turning yellow and also result in limited yield.

The insulated container 20 is preferably closed in use although when the outside conditions are suitable it is possible to leave doors 29 of the insulated container 20 open provided that the temperature inside the container 20 is maintained between 18 and 23 degrees Celsius.

We have found that a seeding rate of 4.5 kg per square meter is desirable for optimal germination of the grain and optimal production of fodder from the production unit 10. Desirably, the grain is pre-soaked in warm water for a period of about 30 minutes to initiate the sprouting process. Desirably a small amount of chlorine may be used to clean the seed of any contaminants, mold spores and pathogens whereby the likelihood of mold becoming a problem within the production unit 10 is minimized. Preferably, the seeds are distributed over the trays 30 with a small gap left around the edge of the trays 30 to enable the seeds to expand as they grow.

Advantageously, we have found that a typical system may require as little as 15 minutes to harvest, clean and re-seed. During growth, barley will generally germinate within 24 hours and grow in the same tray 30 over a six day growth cycle and be ready to harvest as a 15 to 20 cm high grass mat 13. As each tray 30 advances through the racking system 50, the operator can harvest a fresh mat 13 of barley grass form the foremost tray 30. The trays 30 may then be simply rinsed, cleaned and re-seeded and inserted in the back end 28 of the container 20 for subsequent germination and growth.

We have found that the fodder production system of the present invention may use as little as 2-3 liters of water in order to produce 1 kg of green sprouts. Typically conventional growing methods would require approximately 80 liters of water to produce a similar amount of green grass. By maintaining the system free of mold by the use of a small amount of chlorine, no other chemical intervention is required. The seeds contain sufficient nutrients to enable the sprouts to grow to the desired height ready for harvest and no nutrients need to be added to the system in use.

The fodder produced by the present invention is high in protein and may be used to supplement the feed of beef cattle, dairy cattle, stable and race horses, sheep, goats, pigs, chickens, zoo animals as well as for use in producing sprouts for human consumption.

FIGS. 1-3 and 5 illustrate the transportable fodder production unit 10 for connecting with a water source 15, such as a municipal water supply, well, or water tank, and a power source 16, such as a utility electrical service.

The fodder production unit 10 includes an insulated container 20 having a front end 22 and a rear end 28. Selectively openable and lockable doors 29 are preferably included on each end 22,28. Wheels 27 may further be included on a bottom side 21 of the container 20 for facilitating the movement of the container 20 on a ground surface (not shown). Such a container 20 is made preferably from a strong, rigid material capable of withstanding the outdoor elements and insulating the contents therein.

Figure 9:
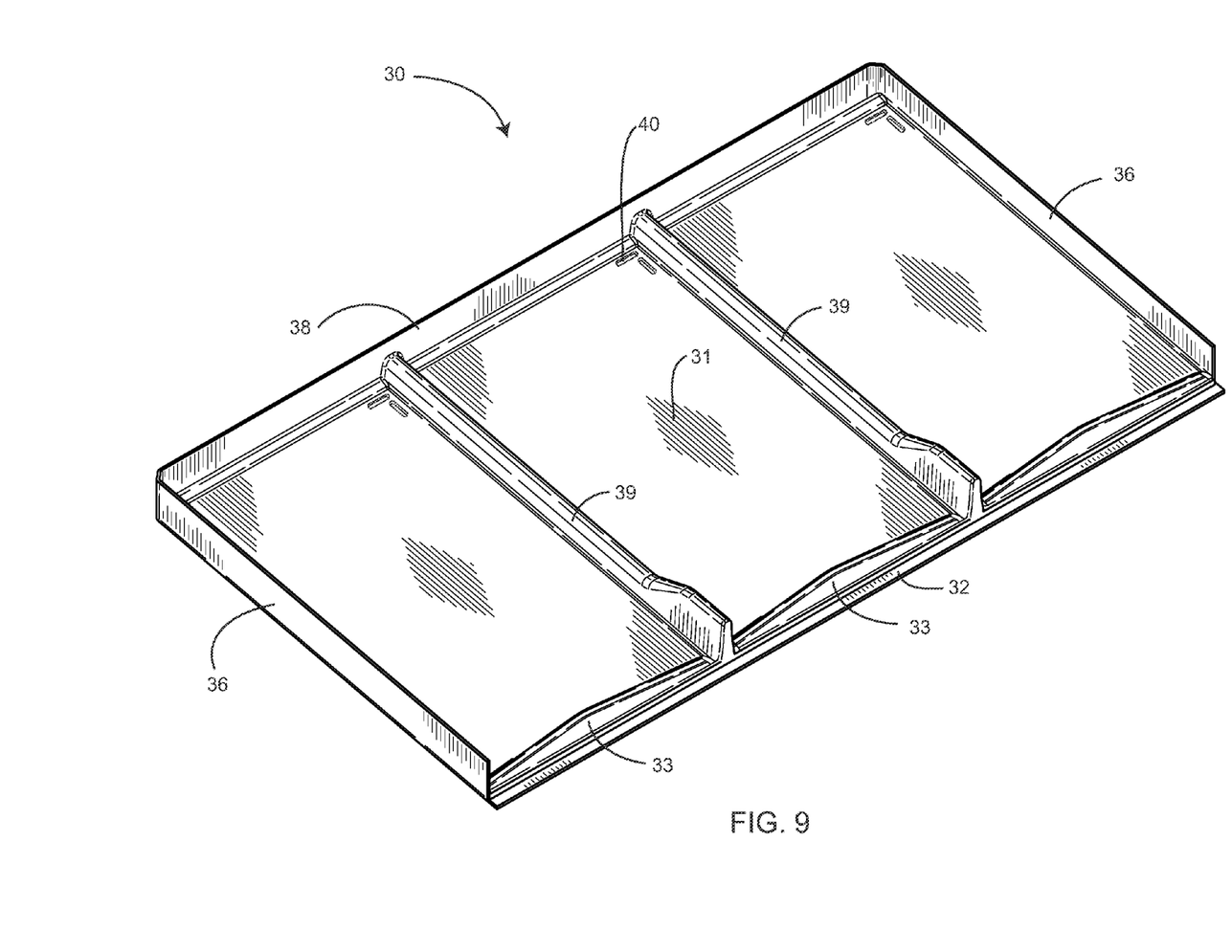
FIG. 9 is a perspective view of one embodiment of a tray of the invention.

The plurality of rigid, preferably plastic trays 30 each have a plurality of drain apertures 40, such as slotted drain apertures 40 (FIG. 9), through a bottom side 31 thereof proximate a rear wall 38 of the tray 30. When such a tray is tipped slightly with the rear wall 38 down, water in the trays 30 runs towards the rear wall 38 of the trays 30 and the drain apertures 40 therein. Preferably each drain apertures 40 is a slotted drain aperture 40. Each tray 30 may further include a pair of side walls 36. A front edge 32 of the tray 30 may include a lip 33 which facilitates the ready removal of mats 13 of grown fodder. The trays 30 may each include at least one intermediate spaced wall 39 for providing the production of segmented mats of the grown fodder.

Figure 1:
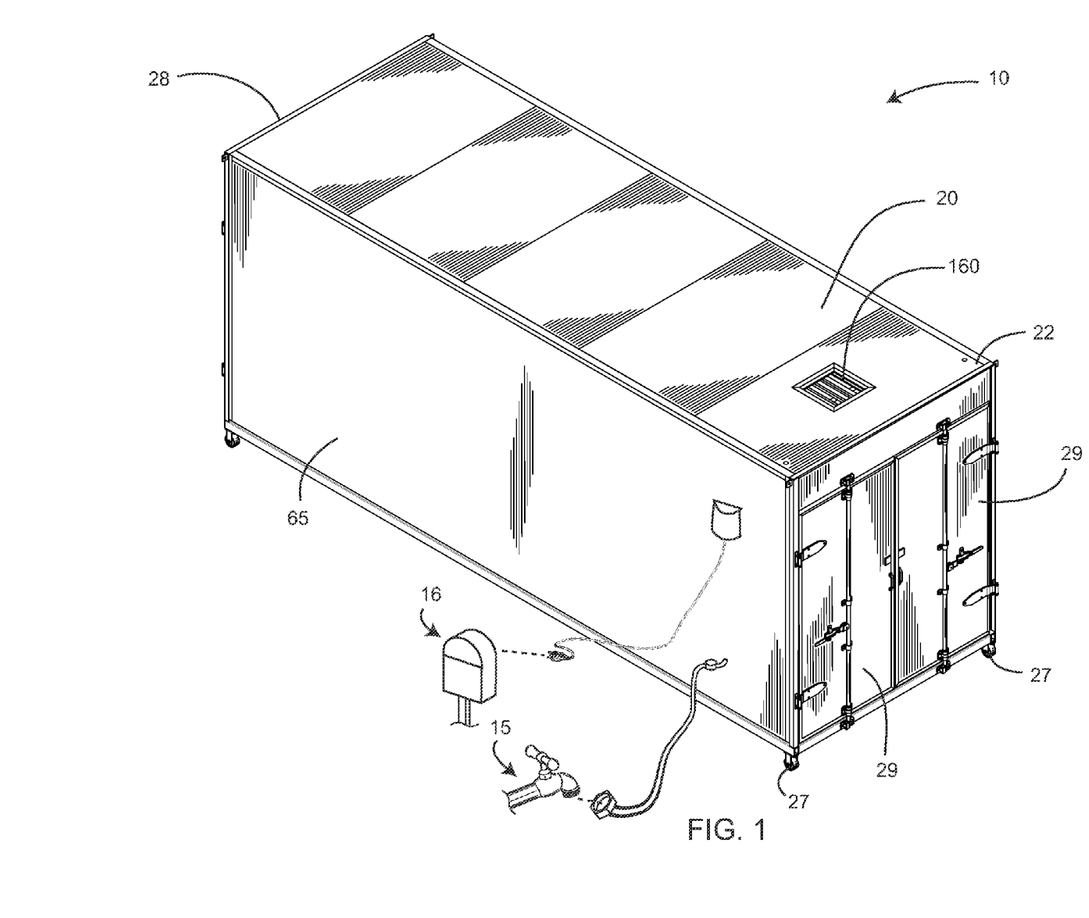
FIG. 1 is a perspective view of the invention, illustrated with doors of a container thereof in a closed position.
Figure 2:
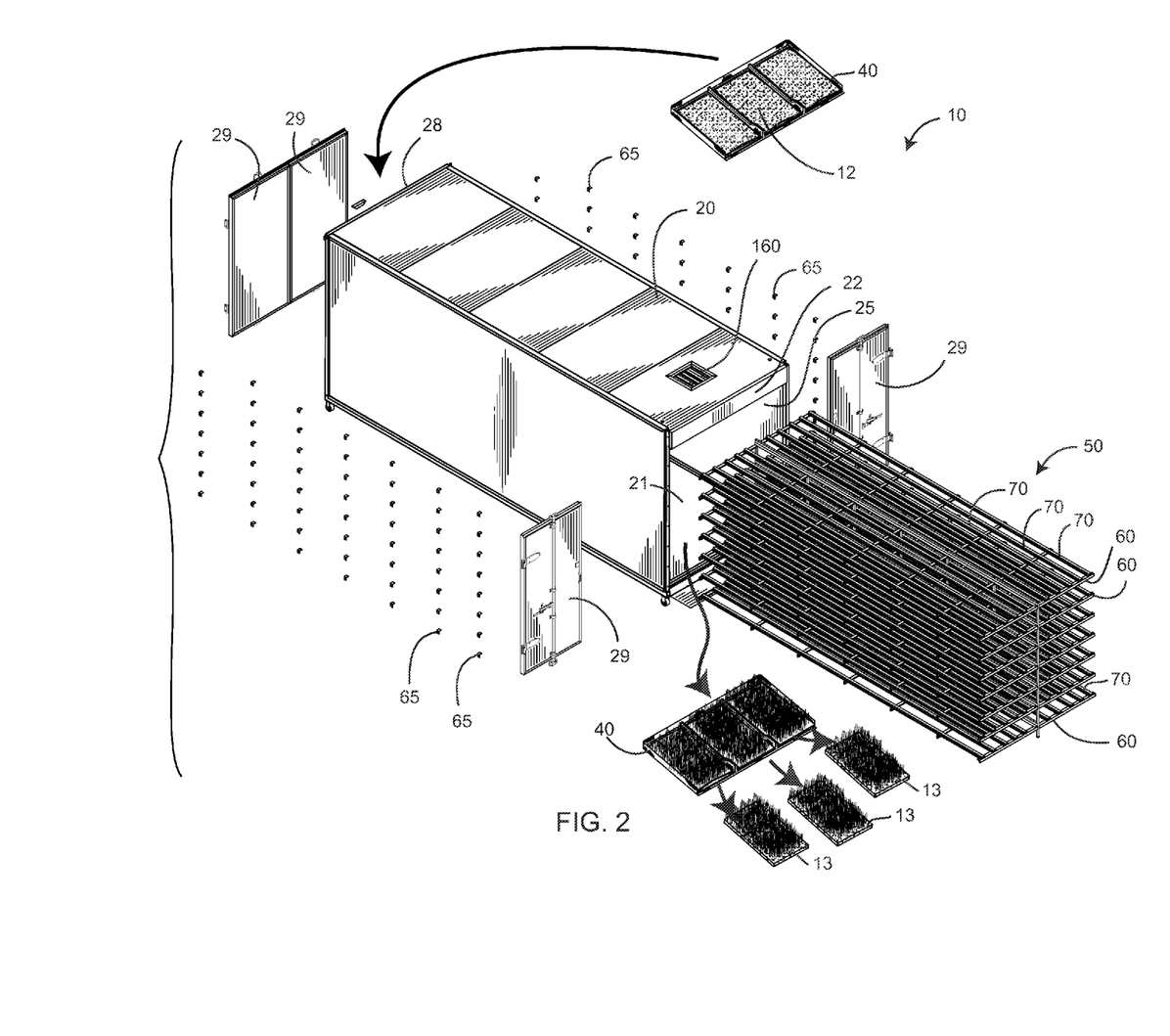
FIG. 2 is an exploded perspective view of FIG. 1.
Figure 3:
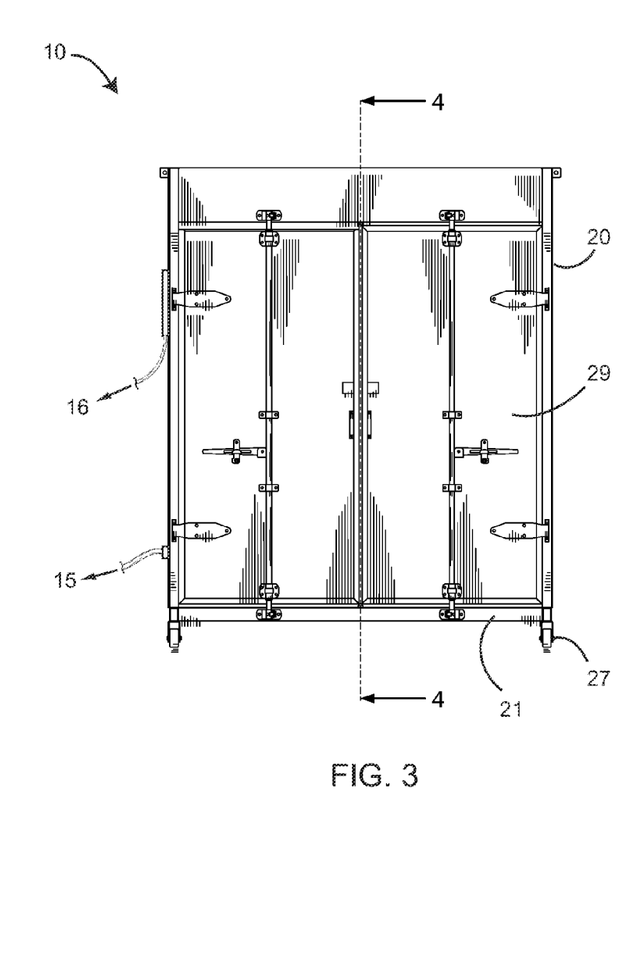
FIG. 3 is a front elevational view of the invention.
Figure 4:
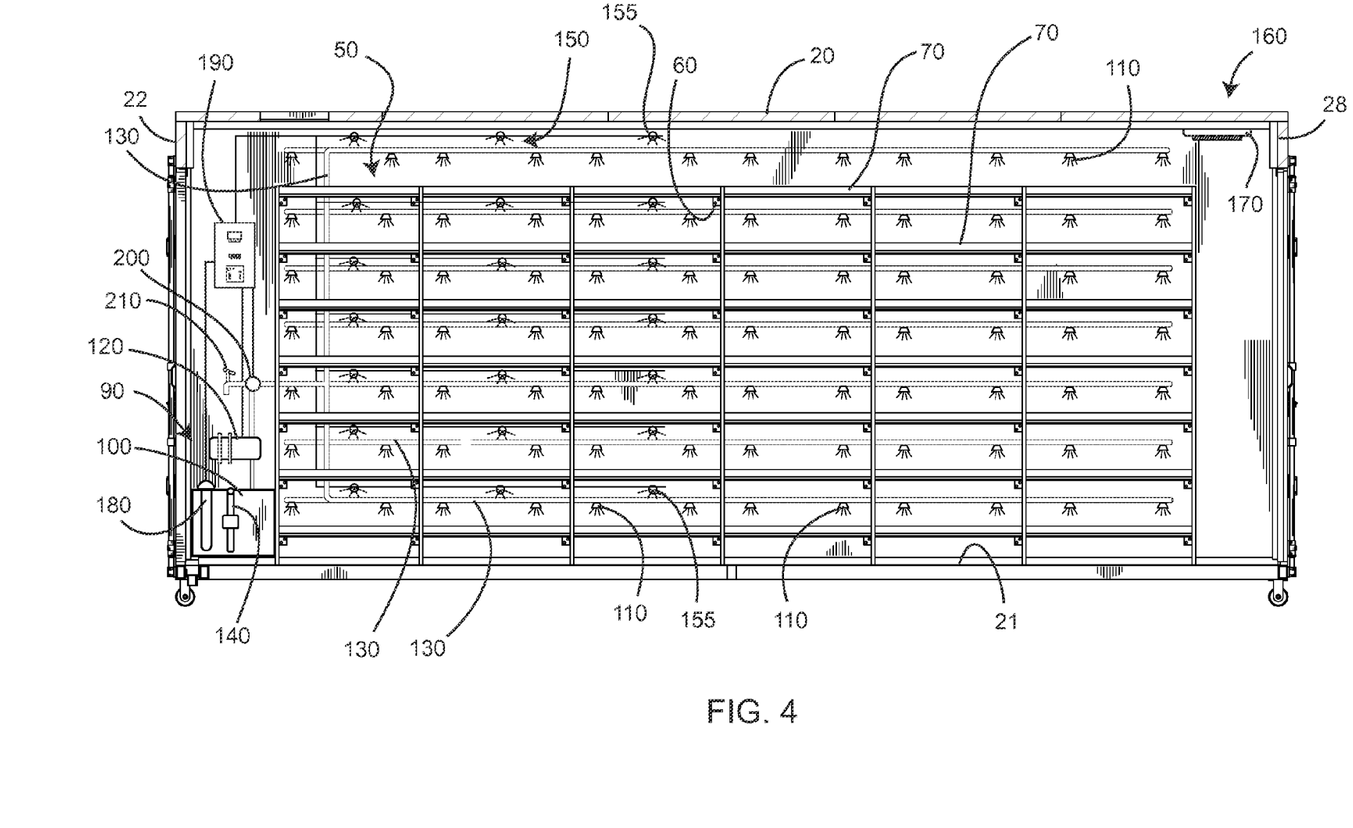
FIG. 4 is a cross-sectional view of the invention, taken along lines 4-4 of FIG. 3.
Figure 5:
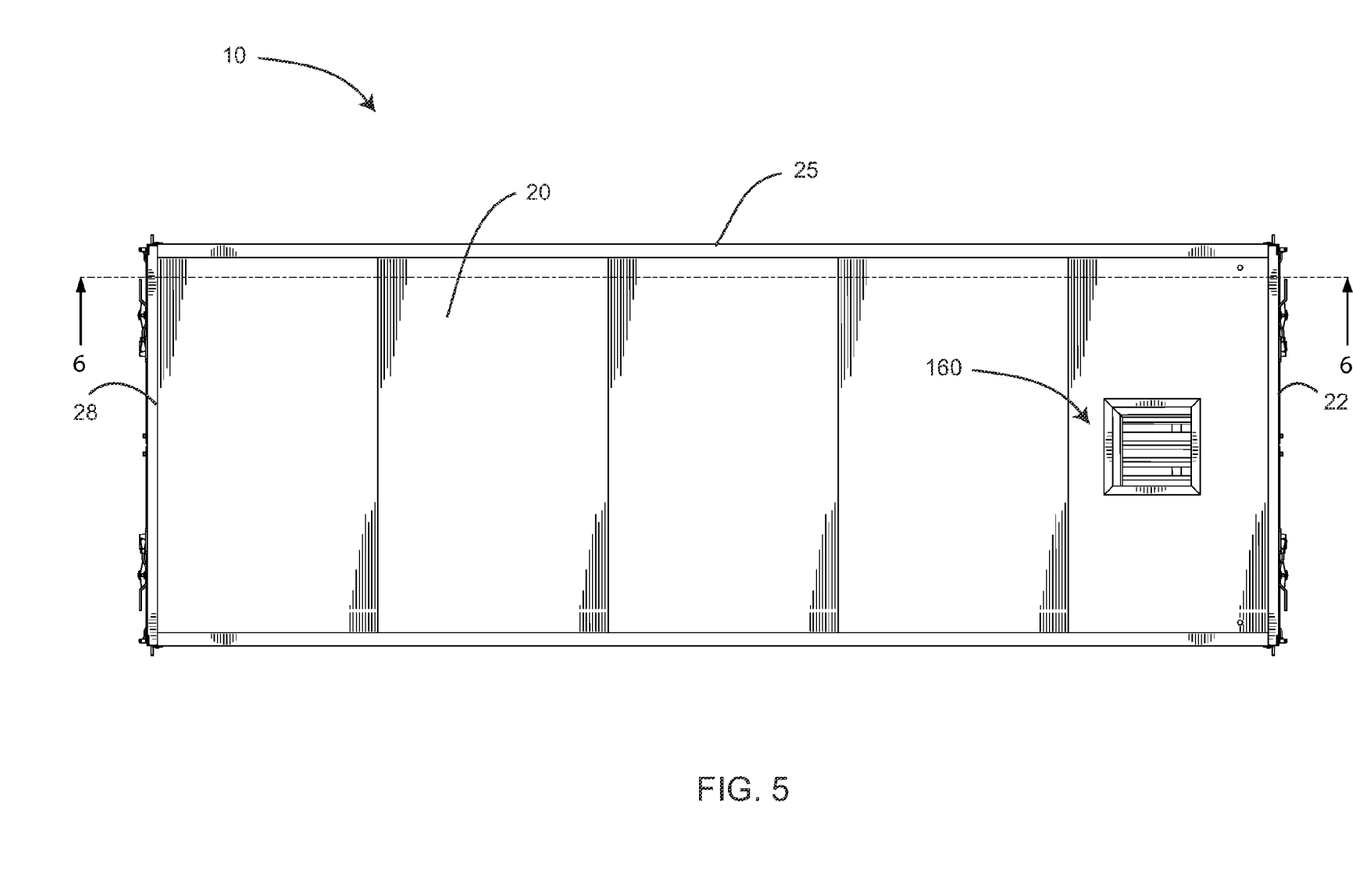
FIG. 5 is a top plan view of the invention.
Figure 6:
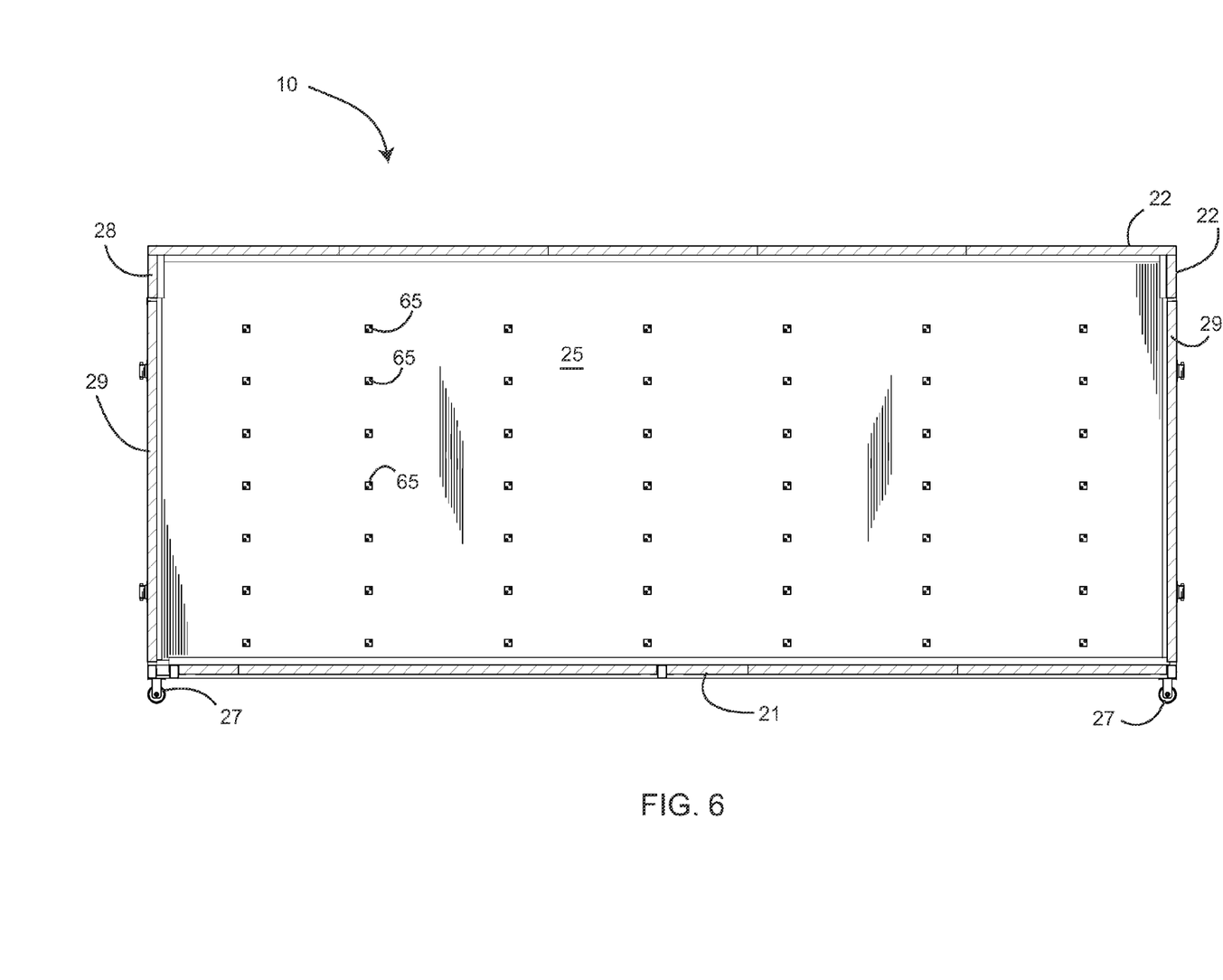
FIG. 6 is a cross-sectional view of the invention, taken along lines 6-6 of FIG. 5.
Figure 7A:
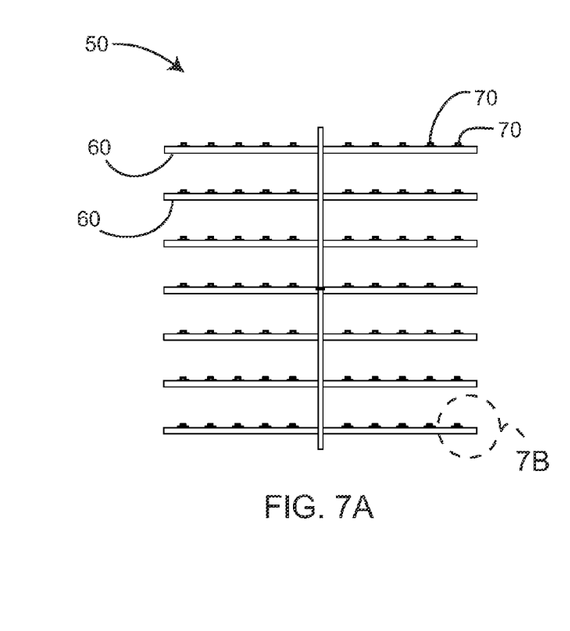
FIG. 7A is a front elevational view of a racking system of the invention.
Figure 7B:
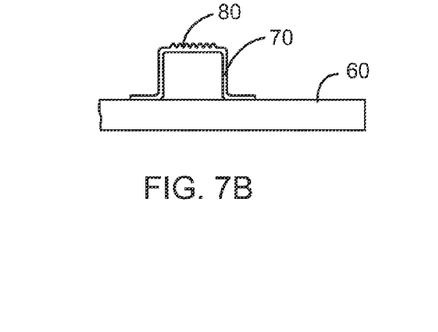
FIG. 7B is a partial view of the racking system, taken along lines 7B-7B of FIG. 7A, and illustrating longitudinal grooves formed in a top surface of a rail of the racking system.

The racking system 50 (FIGS. 2, 4 and 7A) is included for supporting each of the trays 30 within the container 20. The racking system 50 includes the plurality of shelves 60 extending from proximate the front end 22 of the container 20 to proximate the rear end 28 of the container 20. Each shelf 60 is of sufficient width to receive at least one of the trays 30 and of sufficient depth to receive a predetermined number of rows of the trays 30 to cycle through the container 20 in a growing period. The shelves 60 each include a plurality of rails 70 adapted to support each of the trays 30 and to facilitate the sliding of the trays 30 from the front end 22 of the container 20 to the rear end 28 of the container 20. For example, each rail 70 may include a plurality of longitudinally-aligned grooves 80 (FIG. 7B) that reduce the contact area between each tray 30 and the rail 70, and further trap water draining from each tray 30 so as to lubricate each rail 70 thereby. With shelves 60 that are relatively long, such as those for growing crops having longer relative growing times, reduced friction between the trays 30 and the rails 70 along the entire length of a shelf 60 becomes more important. Each shelf 60 is preferably supported within the container on a plurality of rigid L-brackets 65 (FIGS. 1 and 6) that are fixed to the side walls 25 of the container 20. Preferably, during installation, the rear end 28 of the container 20 is raised slightly above the front end 22 of the container 20 so that water in the trays 30 on the shelves 60 will tend to run towards the rear wall 38 of each tray 30. This slight slope, preferably between 5 and 10 degrees, also aids in the sliding of the trays 30 from the rear end 28 to the front end 22 of the container 20.

The irrigation system 90 (FIG. 4) is preferably substantially contained within the container 20. The irrigation system 90 includes the water tank 100 in fluid communication with a plurality of spray heads 110 through a pump 120 and a plurality of pipes 130. The water tank 100 further includes a fill valve 140 connected with the water source 15 and is adapted to refill the water tank 100 when a water level within the water tank 100 drops below a predetermined volume of water. With the water tank 100 inside the container 20, the temperature of the water in the water tank 100 may become substantially equalized with the internal temperature of the container 20.

Figure 8:
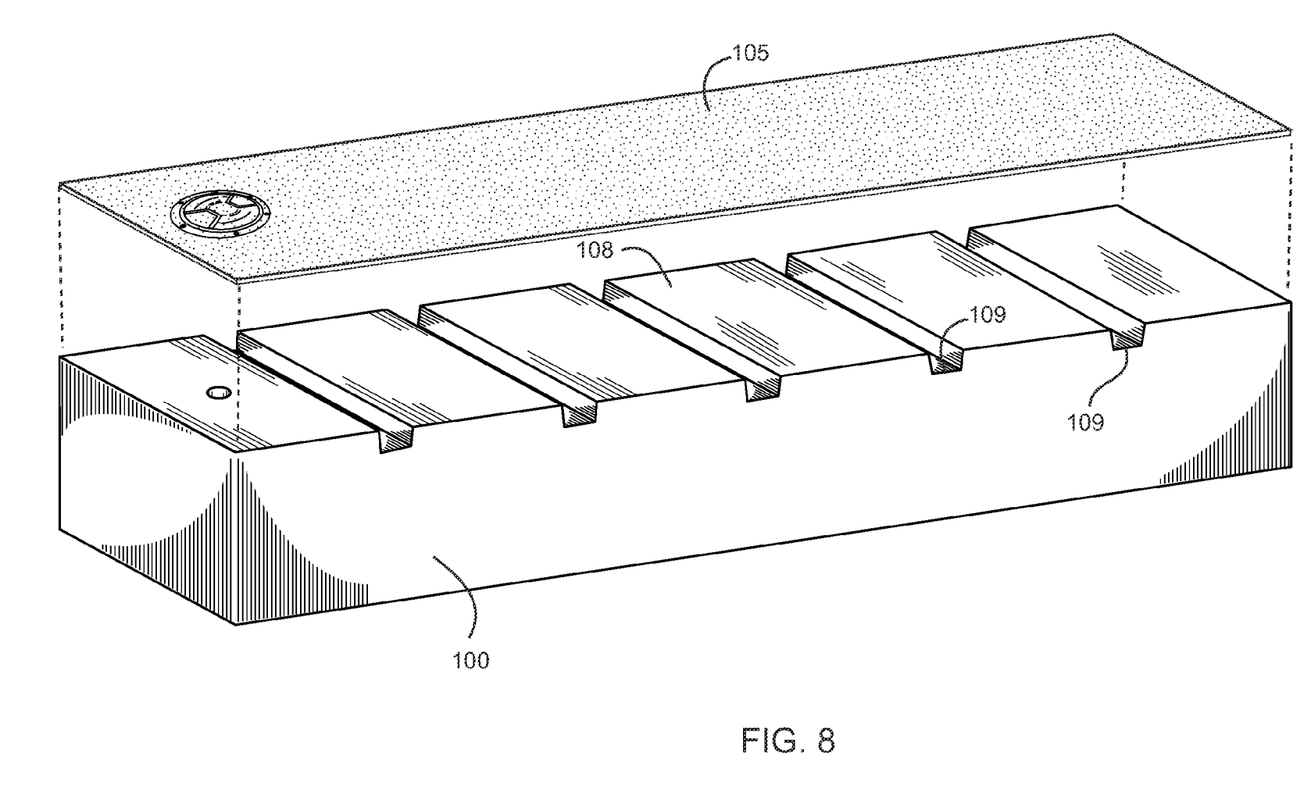
FIG. 8 is a perspective exploded view of a water tank and step of the invention.

Preferably the water tank 100 further includes a rigid metal step 105 (FIG. 8) on a top surface 108 thereof. Such a step 105 may be made with sheet metal, so-called "diamond plate" metal sheet material, or the like. The step 105 and water tank 100 are adapted to support the weight of a person thereon, such as with strengthening ribs 109. As such, an operator may stand on the step to reach the highest shelves 60. The water tank 100, made of a strong plastic material, for example, is positioned proximate the front end 22 of the container 20 on a floor surface 21 thereof. The water tank 100 may further include a water heater 180 for heating the water in the water tank 100 to a predetermined temperature above the temperature within the container 20, thereby further promoting seed germination. The water heater 180 preferably includes a titanium core water heater element (not shown).

The lighting system 150 (FIG. 4) is connected with the power source 16 and maintains a predetermined illumination within the container 20. Such a lighting system 150 includes, at a minimum, a plurality of bulbs 155, such as fluorescent bulbs, for illuminating each tray 30 from the front end 22 of the container towards the rear end 28 of the container 20, stopping at a point before the growing process wherein the seeds 12 have not yet sprouted.

The thermal control system 160 (FIG. 4) is connected with the power source 16 and maintains the temperature inside the container 20 within a predetermined temperature range. The thermal control system 160 may further include a humidity control system for maintaining the humidity within the container 20 within a predetermined humidity range. Such a thermal control system 160 may include a reverse cycle air condition 170 preset to maintain the temperature in the container 20 within the range of from 18 to 23 degrees Celsius, and within the range of between 40 and 80 percent humidity.

The central control system 190 (FIGS. 4, 9 and 10) is electrically connected with the pump 120 of the irrigation system 90, the lighting system 150, the thermal control system 160, and the water heater 180. As such, the control system 190 may be programmed to activate the pump 120 to spray the trays 30 on a preset schedule, to activate the lighting system 150 on a present schedule, to activate the thermal control system as necessary based on the temperature and humidity within the container 20, and for controlling the water temperature based on a preset schedule. The central control system 190 regulates the electrical current draw from the fodder production unit 10 by ensuring the pump 120, lighting system 150, thermal control system 160, and water heater 180 are never activated simultaneously. That is to say, the central control system 190 enforces ampacity sharing between the highest electrical loads, or in such a way that whatever loads are active do not add up to a current beyond a predetermined capacity, such as 16 amps or 20 amps.

In one embodiment, the irrigation system 160 further includes an electronically-actuated water valve 200 (FIG. 4) for diverting water from the pump 120 to either the plurality of spray heads 110 over the trays 130, or to a hose spigot 210 for manual spraying of the trays 30 with a hose (not shown). As such, the central control system 190 including a mode for setting the valve 200 to the hose spigot 210, activating the pump 120, and preventing other systems 90,150,160 from operating so as not to draw more electrical current from the power source 16 than the predetermined level. The thermostat of the thermal control system 160 may be included as part of the control system 190.

In use, the trays 30 are filled with seeds 12 and loaded into the rear end 28 of the container 20. The trays 30 are urged forward by an operator as the fodder progresses through the growing period. The trays 30 are removed at the front end 22 of the container with mats 13 of grown fodder. Throughout the growing process, the pump 120 periodically pumps water from the water tank 100 through the pipes 130 to the plurality of spray heads 110 for spraying each tray 30 with a predetermined volume of water or for a predetermined period of time (FIG. 10). Meanwhile the thermal control system 160 maintains a desired temperature range within the container 20 and the lighting system 150 cycles the lamps 155 on and off based on a given schedule.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A transportable fodder production unit for connecting with a water source and a power source, comprising:
   an insulated container having a front end and a rear end;
   a plurality of trays each having a plurality of drain apertures through a bottom side thereof;
   a racking system having a plurality of shelves extending from proximate the front end of the container to proximate the rear end of the container, the shelves being of sufficient width to receive at least one of the trays and of sufficient depth to receive a predetermined number of rows of the trays to cycle through the container in a growing period, the shelves including rails extending horizontally across each row in a grid configuration, the rails adapted to support each of the trays and to facilitate the sliding of the trays from the front end of the container to the rear end of the container;
   an irrigation system having a closed water tank in fluid communication with a plurality of spray heads through a pump and a plurality of pipes, the water tank including a fill valve connected with the water source for refilling the water tank when a water level within the tank drops below a predetermined volume of water;
   a lighting system connected with the power source that maintains a predetermined illumination within the container; and
   a thermal control system connected with the power source that maintains the temperature inside the container within a predetermined temperature range;
   whereby seeded trays may be loaded onto the rear end of the container, urged forward by an operator as the fodder progresses through the growing period, and removed from the front of the container with mats of grown fodder, the pump periodically pumping water from the water tank through the pipes to the plurality of spray heads for spraying each tray with a predetermined volume of water.

2. The fodder production unit of claim 1 wherein the plurality of drain apertures through a bottom side of each tray are positioned proximate the rear wall of each tray, such that when the front of each tray is raised water in the tray runs towards the rear wall and towards the apertures.

3. The fodder production unit of claim 1 wherein each tray includes side and rear walls, and wherein the front of the tray includes a lip which facilitates the ready removal of mats of grown fodder.

4. The fodder production unit of claim 1 wherein the trays are provided with intermediate spaced walls extending from the front to the rear of the tray thereby providing for the production of segmented mats of grown fodder.

5. The fodder production unit of claim 1 wherein the water tank includes a rigid step on a top surface thereof and is adapted to support the weight of a person thereon, the water tank being positioned proximate the front of the container on a floor surface thereof.

6. The fodder production unit of claim 1 wherein the thermal control system is in the form of a reverse cycle air conditioner preset to maintain the temperature in the insulated container in the range of from 18 to 23 degrees Celsius.

7. The fodder production unit of claim 1 wherein the thermal control system is in the form of a reverse cycle air conditioner preset to maintain the humidity in the insulated container in the range of between 40 and 80 percent.

8. The fodder production unit of claim 1 wherein each rail of each shelf includes longitudinally aligned grooves, such that sliding of each tray along the rails is facilitated through reduced frictional contact therebetween and water draining from the tray.

9. The fodder production unit of claim 1 wherein the irrigation system is substantially contained within the container, whereby the temperature of the water in the water tank may become equalized with the internal temperature of the container.

10. The fodder production unit of claim 1 wherein the water tank further includes a water heater for heating the water in the water tank to a predetermined temperature.

11. The fodder production unit of claim 1 further including a central control system electrically connected with the pump of the irrigation system, the lighting system, and the thermal control system, such that the central control system may be programmed to activate the pump to spray the trays on a preset schedule, to activate the lighting system on a preset schedule, and to activate the thermal control system as necessary based on the temperature and humidity within the container.

12. The fodder production unit of claim 11 wherein the water tank further includes a water heater for heating the water in the water tank to a predetermined temperature, and wherein the central control system is also electrically connected to the water heater for controlling the water temperature based on a preset schedule.

13. The fodder production unit of claim 11 wherein the central control system further prevents the cumulative current draw of the irrigation system, lighting system, and thermal control system to exceed a predetermined level, shutting off one or more such systems before activating another if necessary to keep the cumulative current draw of the production unit below the predetermined level.

14. The fodder production unit of claim 11 wherein the irrigation system further includes an electronically-actuated valve for diverting water from the pump to either the plurality of spray heads over the trays, or to a hose spigot for manual spraying of the trays, the central control system including a mode for setting the valve to the hose spigot, activating the pump, and preventing other systems from operating so as not to draw more electrical current from the power source than the predetermined level.

15. The fodder production unit of claim 1 wherein the racking system further comprises a plurality of trays placed horizontally along the width of each row.

* * * * *